United States Patent [19]
Alger

[11] Patent Number: 5,345,458
[45] Date of Patent: Sep. 6, 1994

[54] MULTIPLE DENSITY LAYERED INSULATOR

[75] Inventor: Terry W. Alger, Tracy, Calif.

[73] Assignee: The United States of America as represented by the Department of Energy, Washington, D.C.

[21] Appl. No.: 915,201

[22] Filed: Sep. 25, 1986

[51] Int. Cl.$^5$ ............................................. H01S 3/04
[52] U.S. Cl. ............................................. 372/34; 372/56
[58] Field of Search .............................. 372/34, 33, 56

[56] References Cited

U.S. PATENT DOCUMENTS

| | | | |
|---|---|---|---|
| 3,440,558 | 4/1969 | Cameron | 372/34 |
| 3,452,295 | 6/1969 | Sher | 372/33 |
| 3,599,113 | 8/1971 | Cremosnik | 372/36 X |
| 3,626,319 | 12/1971 | Gilbert | 372/34 |
| 3,626,323 | 12/1971 | Ineichen | 372/36 |
| 3,942,880 | 3/1976 | Zeiders, Jr. | 372/33 X |
| 4,247,829 | 1/1981 | Yagi et al. | 372/34 X |
| 4,277,761 | 7/1981 | Silva et al. | 372/33 X |

*Primary Examiner*—Mark Hellner
*Attorney, Agent, or Firm*—Niguel A. Valdes; Roger S. Gaither; William R. Moser

[57] ABSTRACT

A multiple density layered insulator for use with a laser is disclosed which provides at least two different insulation materials for a laser discharge tube, where the two insulation materials have different thermoconductivities. The multiple layer insulation materials provide for improved thermoconductivity capability for improved laser operation.

5 Claims, 2 Drawing Sheets

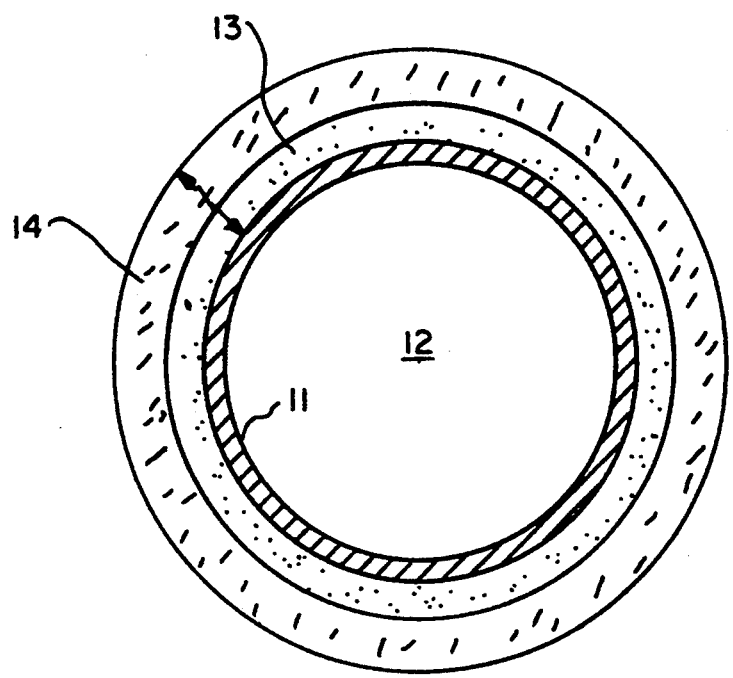
FIG.—1B
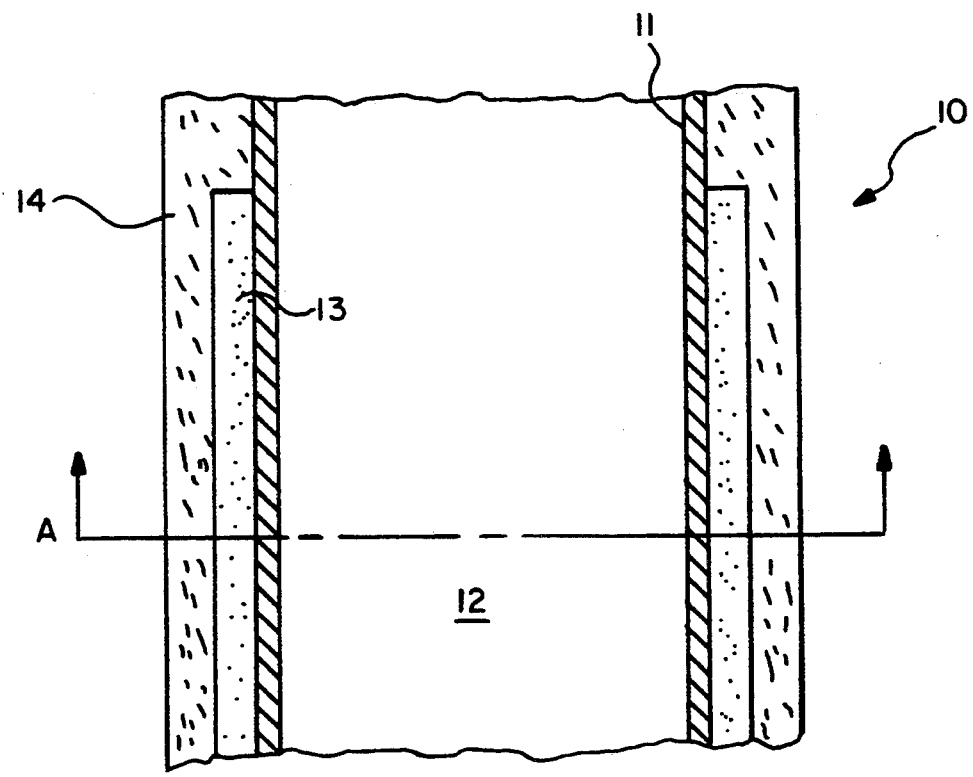
FIG.—1A

MULTIPLE DENSITY LAYERED INSULATOR

The United States government has rights in this invention pursuant to Contract No. W7405-ENG-48 between the United States Department of Energy and the University of California for the operation of Lawrence Livermore National Laboratory.

FIELD OF THE INVENTION

The present invention is directed to an insulator for controlling heat dissipation from a laser.

BACKGROUND OF THE INVENTION

In considering means for improving the thermal efficiency of overall laser operation, one important consideration is the thermal conductivity of insulation materials surrounding the laser discharge chamber. A common approach is to use a single material of a predetermined thermal conductivity as insulation. However, one of the problems which arises in using only one type of insulation material is that its thermal conductivity may be insufficient, within certain temperature ranges, to provide optimum temperature parameters required for overall efficient laser operation. As an example, in a metal vapor laser such as a copper vapor laser, insulation material is usually utilized which provides the least thermal conductivity in the temperature range of about 1600° C. (the approximate interior temperature of the copper vapor laser) to about room temperature, which is the temperature of the environment of the laser. However, a single insulation material generally is not capable of providing suitable thermal conductivity within such a temperature range for maximum efficiency of operation of the laser.

SUMMARY OF THE INVENTION

It is thus an object of the present invention to provide a multiple density insulation material for a laser which is characterized by an overall thermal conductivity which limits the temperature within the insulation during operation of the laser to a predetermined maximum temperature.

It is a further object of the present invention to provide an improved laser insulation material comprising two layers, each layer having a different thermal conductivity.

Briefly, the present invention provides an improved laser insulator wherein the insulation materials for the housing of the laser are characterized by a thickness and effective thermal conductivity such that, within the predetermined temperature range defined by the temperature, $T_1$, at the laser housing and the temperature, $T_2$, on the outer surface of the insulation materials, the temperature within the insulation materials does not exceed $T_1$ during operation of the laser.

Additional objects, advantages and novel features of the present invention will be set forth in part in the following description and in part will become apparent from those skilled in the art upon examination of the following, or may be learned by practice of the invention. The objects and advantages of the invention may be realized and obtained by means of the instrumentalities and combinations particularly pointed out in the appended claims.

BRIEF DESCRIPTION OF THE DRAWINGS

In the accompanying drawings, incorporated into and forming a part of the specification, there are illustrated preferred embodiments of the invention. Together with the description, the drawings serve to explain the principles of the invention.

FIG. 1A is a partial longitudinal cross-section of a laser housing illustrating a multiple density insulation material according to the present invention.

FIG. 1B is a cross-sectional view of the laser tube of FIG. 1A taken along line A.

DETAILED DESCRIPTION OF THE PREFERRED EMBODIMENTS

Figure 2:
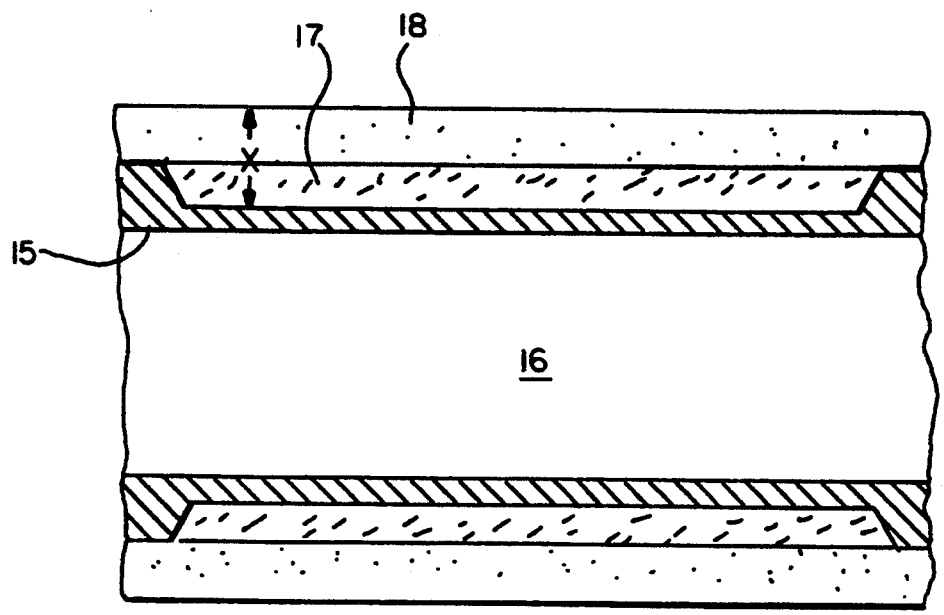
FIG. 2 is a partial cross-sectional longitudinal view of another embodiment of a dual density insulation material according to the present invention used on a tubular laser.

Reference will be made to the preferred embodiments of the invention, examples of which are illustrated in the accompanying FIGURES. While the invention will be described in connection with the preferred embodiments, it will be understood that the invention is not limited thereto. Thus, to facilitate description of the invention, the following description is given in parts in terms of a copper vapor laser (CVL), but it will be understood that the invention is directed to any metal vapor laser. The invention is intended to cover all alternatives, modifications and equivalents as may be included within the spirit and scope of the invention as defined herein and by the appended claims.

Referring to FIG. 1A, there is shown a partial longitudinal cross-section of a metal vapor laser 10. The walls 11 of the laser tube are made of typical ceramic materials capable of withstanding the temperature of a metal vapor laser. Typical materials are alumina ceramics. Generally, in the lasing zone 12 in a copper vapor laser the temperature will be in the range of about 1550° to 1600° C., and the walls 11 will be at or near that same temperature. As shown in FIG. 1A, two types of materials 13 and 14 are used as insulation materials. The inner layer 13 comprises the insulation material characterized by a suitable thermal conductivity, $k_1$, such that, in the temperature range of about 1000° to 1600° C. (if the insulation is utilized for a copper vapor laser) the maximum temperature within the layer 13 during operation of the copper vapor laser does not exceed 1600° C. Such a material may comprise alumina powder which, in a typical copper vapor laser having a bore of 4 inches, would be of a thickness of approximately ⅛ inch. The outer layer 14 will is characterized by a suitable effective thermal conductivity, $k_2$, such that, in the range of about 1000° C. to about room temperature (about 20° C.) the maximum temperature reached within the layer 14 during operation of the copper vapor laser will not exceed 1600° C. A preferred material for layer 14 is alumina fiber, which in a typical copper vapor laser of 4 bore, utilizing the ⅛ inch thick alumina powder layer 13, would be of a thickness of about ⅜ to ¾ inch.

Referring to FIG. 1B there is shown an end cross-sectional view of the laser of FIG. 1A. In particular, the thermal conductivity along the radial thickness, x, is a critical factor in selecting the multiple density insulation materials according to the present invention.

Figure 3:
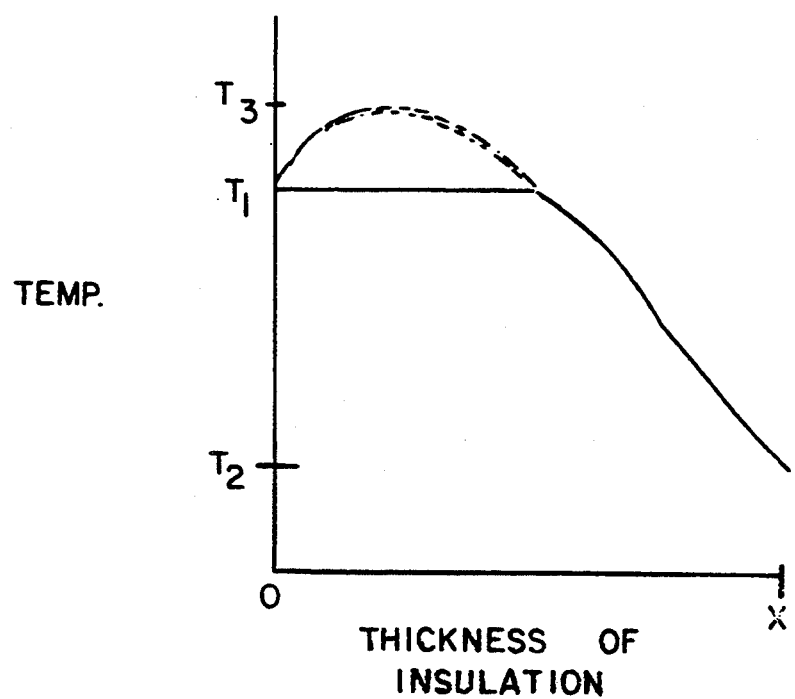
FIG. 3 is a graph of the theoretical temperature profile of the insulation material according to the present invention through the radial dimension, x, of the insulation material.

Thus, referring to FIG. 3, a theoretical plot of the temperature profile along thickness x, is shown (solid line). Along the abscissa, the 0 point represents the interface between the inner layer (for example, layer 14 in FIG. 1A), with the outer surface of the laser housing (for example, wall 11 in FIG. 1A). The value for x is at the outer surface of the outermost insulation layer. Thus, the temperature represented by $T_1$ is the temperature of the laser housing, which is about the temperature within the laser chamber, 1600° C. As heat is dissipated through the insulation layers, in accordance with the present invention, the temperature at any location in an insulation is no greater than $T_1$. All the outer edge of the insulation the temperature thus drops to a temperature of $T_2$. In the usual instance, without use of the present invention, utilizing a single insulation material, the temperature along the radial distance x will initially rise (dotted line in FIG. 3) before dropping to the temperature $T_2$. This rise in temperature to $T_3$ leads to problems, which adversely affect the operational life and efficiency of the laser. For example, temperature $T_3$ may increase the thermal stress on the laser housing and possibly have adverse effects on electrical and plumbing components of the laser. Also, since the optimal temperature for operation of the laser is at or near $T_1$, a rise in temperature to $T_3$ within the insulation near the wall of the laser upsets the thermal balance within the lasing zone, thus affecting the optimal efficiency of the laser.

Referring to FIG. 2 there is shown a second embodiment of the present invention wherein the thickness of the laser housing wall 15 is not constant along the length of the laser tube. The thickness of the wall 15 is thinner in the vicinity of the lasing zone 16. The different layers of insulation materials 17 and 18 are then utilized to effect a thermal heat conductivity in accordance with the present invention.

In a third embodiment, not shown, the inner layer of thermal insulation may comprise one material and this inner layer will then be covered by a plurality of metal foil layers. As an example, such an inner layer may comprise zirconia and the outer layers may comprise sheets of metal foil, such as aluminum foil.

It will be understood that the foregoing description of the preferred embodiments of the invention is provided for purposes of illustration and description. It is not intended to be exhaustive or to limit the invention to the precise forms disclosed and, obviously, many modifications and variations are possible in light of the above teachings. The embodiments were chosen and described in order to best explain the principles of the invention and their practical application to thereby enable others skilled in the art to best utilize the invention and the various embodiments, and with various modifications as are suited to the particular use contemplated, and it is intended that the scope of the invention be defined by the claims appended hereto.

What is claimed is:

1. In a metal vapor laser comprising a housing for the laser discharge chamber, the improvement comprising insulation materials annularly surrounding the exterior of said housing, said materials comprising an inner layer contiguous to said housing of a first insulating material, and an outer layer contiguous to said inner layer comprising a second insulating material, said first insulating material selected from the group consisting of aluminum powder and zirconia, and said second insulating material selected from the group consisting of aluminum fiber and metal foil, respectively, wherein the respective thicknesses of each of said layers are such that when the temperature of said housing is 1600° C., the maximum temperature within said layers is no greater than 1600° C.

2. A laser according to claim 1 wherein said inner layer comprises aluminum powder and said outer layer comprises aluminum fiber.

3. A laser according to claim 2 wherein the thickness of said inner layer is about $\frac{1}{8}''$ and the thickness of said outer layer is in the range of about $\frac{5}{8}-\frac{3}{4}''$.

4. A laser according to claim 1 wherein said insulation materials comprise an inner layer comprising zirconia and said outer layer comprises a plurality of metal foil layers thereover.

5. A laser according to claim 1 wherein said metal vapor laser is a copper vapor laser.

* * * * *